United States Patent [19]
Canova et al.

[11] Patent Number: 4,889,896
[45] Date of Patent: Dec. 26, 1989

[54] PROCESS FOR THE IMIDIZATION OF COPOLYMERS OF MALEIC ANHYDRIDE WITH VINYL-AROMATIC MONOMERS

[75] Inventors: Luciano Canova, Novara; Umberto Giannini, Milan; Enrico Albizzati, Novara; Italo Borghi, Ferrara; Antonio Proto, Novara, all of Italy

[73] Assignee: Montedipe S.p.A., Milan, Italy

[21] Appl. No.: 289,824

[22] Filed: Dec. 27, 1988

[30] Foreign Application Priority Data

Dec. 29, 1987 [IT] Italy ................. 23242 A/87

[51] Int. Cl.$^4$ ................................. C08F 8/70
[52] U.S. Cl. ................. 525/375; 525/327.6; 525/379; 525/380
[58] Field of Search .............. 525/327.6, 375, 379, 525/380

[56] References Cited

U.S. PATENT DOCUMENTS

| | | | |
|---|---|---|---|
| 3,370,047 | 2/1968 | Raines | 525/327.6 |
| 3,520,852 | 7/1970 | Pratt et al. | 525/327.6 |
| 3,557,066 | 1/1971 | Cohen et al. | 525/327.6 |
| 3,578,641 | 5/1971 | Johnson | 525/327.6 |
| 3,639,357 | 2/1972 | Cohen | 525/327.6 |
| 3,799,877 | 3/1974 | Nnadi et al. | 525/327.6 |
| 3,801,549 | 4/1974 | Moore et al. | 525/327.6 |
| 4,065,435 | 12/1977 | Sakaguchi et al. | 525/327.6 |
| 4,157,431 | 6/1979 | Fields et al. | 525/327.6 |
| 4,399,263 | 8/1983 | Brodoway | 525/327.6 |
| 4,511,369 | 4/1985 | Denis et al. | 525/327.6 |
| 4,588,786 | 5/1986 | Kadono et al. | 525/327.6 |
| 4,670,516 | 6/1987 | Sackmann et al. | 525/327.6 |
| 4,731,095 | 3/1988 | Garapon et al. | 525/327.6 |

Primary Examiner—Joseph L. Schofer
Assistant Examiner—Bernard Lipman
Attorney, Agent, or Firm—Stevens, Davis, Miller & Mosher

[57] ABSTRACT

The invention concerns a process for the imidization of copolymers of maleic anhydride with vinyl-aromatic monomers using an urea as the imidizing agent.

31 Claims, No Drawings

PROCESS FOR THE IMIDIZATION OF COPOLYMERS OF MALEIC ANHYDRIDE WITH VINYL-AROMATIC MONOMERS

BACKGROUND OF THE INVENTION

The invention relates to a process for imidizing copolymers of maleic anhydride with vinyl-aromatic monomers, in particular styrene, and optionally with other monomers.

These copolymers are known, for instance, from U.S. Pat. No. 3.954.722; another U.S. Pat. No. (4.167.543) foresees the addition of acrylonitrile as a third monomer. Said copolymers, marketed, for instance by the ARCO Company under the trade mark 'DYLARC', may be processed under heat, but when they are blended with other polymeric products at high temperatures (in order to obtain, for example, an impact resisting material) there are observed decomposition reactions as well as the formation of surface blisters and of cross-linkings.

The processing becomes thus extremely difficult and the look of the surfaces may be unacceptable. If the maleic anhydride is replaced by the corresponding imide, as described in British Pat. No. 1.185.544, these drawbacks disappear and there are processes which allow to obtain these copolymers starting from a preformed maleic imide as a starting monomer, thereby obtaining substantially equimolar copolymers (styrene:imide=1:1 by mols) or non-equimolar copolymers (with an imide content lower than 50% by mols). The maleic imide is not, however, easily available and its synthesis is rather troublesome and complicated.

Alternatively, U.S. Pat. Nos. 3.651.171; 3.840.499; 4.381.373 and German Pat. No. 3.430.802, teach to imidize a preformed copolymer in the presence of water. Moreover, U.S. Pat. No. 4.404.322 teaches that the imidization with amines (notoriously very expensive) may be carried out either in the molten state or in an organic solvent. The contents of all the above cited patents are an integrating part of the present description. The imidized copolymers thus obtained have a much higher glass transition temperature, (Tg, defined further on), with respect to the non-imidized copolymers, but the Applicant has now found that there is a much simpler and more economical process which allows to obtain copolymers imidized at a level of quality equivalent and sometimes superior.

DISCLOSURE OF THE INVENTION

In its widest form the invention concerns a process for imidizing copolymers of maleic anhydride with vinyl-aromatic monomers, and optionally other comonomers, using an urea as the imidizing agent, the imidization being achieved maintaining the reacting mixture in a molten state, or alternatively, working in the presence of organic solvents for the copolymers, such as for example aromatic hydrocarbons, ketones and the like; it is advisable to work in the anhydrous state, that is, in the absence of water.

The amount of said imidizing agent may vary from 1 to 300 mols (preferably from 5 to 250 mols) per 100 mols of anhydride groups present in the copolymer.

The imidization can be advantageously performed in the presence of an imidization catalyst; the amount of said catalyst may range from 0.0001 to 1000 mols (preferably 0.01–10 mols) per 100 mols of anhydride groups present in the copolymer.

The original copolymer to be imidized may contain from 5 to 50%, but preferably from 10% to 50% (by mols) of maleic anhydride.

Examples of vinyl-aromatic compounds, suited for being used as co-monomers of maleic anhydride, are: styrene, alpha-methyl-styrene, p-methyl-styrene, p-tertiary-butyl-styrene, ortho- or para-chlorostyrene, etc. Moreover, there may be present other co-monomers belonging to the class of unsaturated olefinic monomers, such as for instance: acrylonitrile, vinyl chloride, vinylidene fluoride, vinyl acetate, olefines, vinyl ethers, diolefines, halogenated diolefines, etc. The basic copolymers may contain an elastomeric phase of various character, owing an impact-resitance function.

Examples of ureas suitable for being used as imidizing agents are for example the ureas having formula: RHN—CO—NHR' wherein R and R', either equal to or different from each other, represent: hydrogen, the $NH_2CO$— group or alkyl, cycloalkyl, aryl or heterocyclic groups (optionally substituted) having from 1 to 18 C atoms.

As an alkyl group we mean also an aryl-alkyl group, a cycloalkyl-alkyl group or an alkyl group bearing heterocyclic substituting groups; as an aryl group we mean also an alkylaryl group, a cyclo-alkyl-aryl group or an aryl group bearing heterocyclic substituting groups; as a cycloalkyl group we mean also an alkyl-cycloalkyl group, an aryl-cycloalkyl group or a cycloalkyl group bearing heterocyclic substituting groups; as a heterocyclic group we mean also an alkyl-, cycloalkyl-, aryl-, alcoxy- or carboxy-heterocyclic group.

For a purely exemplifying purpose, we may mention urea, dimethyl-urea, propyl-urea, di-butyl-urea, di-cyclo-hexyl-urea, phenyl-urea, di-phenyl-urea and bi-uret.

The imidized copolymer object of the present invention show an excellent stability to heat (thermal stability) (TLS) and a content in imidic units greater than 5% by mols. According to the spectrophotometric infrared (IR) analysis, it is possible to conclude that these imidic units are of the cyclic type, although this structure is not binding for the purposes of this invention.

The imidization reaction may be conducted by reacting a styrene-maleic anhydride copolymer with the imidization agent at a high temperature. The most commonly used reaction temperatures are those comprised between 100° and 350° C. (but preferably between 120° and 280° C.). The reaction may be conducted both at a pressure below room pressure as well as at a higher pressure.

The catalyst to be used in the process according to this invention may be selected from Lewis acids, strong Broensted acids, salts of said strong Broensted acids and mixtures thereof. As "stron" Broensted acids we mean those acids showing a pK equal to or lower than 5, but preferably 3.

Amongst the Lewis acids there may be cited, for purely exemplifying purposes: zinc chloride, boron fluoride, aluminum chloride and aluminum bromide, the tin and titanium tetrachlorides, antimony-penta-chloride and antimony penta-fluoride ($ZnCl_2$, $BF_3$, $AlCl_3$, $AlBr_3$, $SnCl_4$, $TiCl_4$, $SbCl_5$, $SbF_5$); moreover, we also cite triphenyl-boron and triphenoxy-boron.

As Broensted strong acids and their salts, we may cite just for purely exemplifying purposes: hydrochloric acid, fluorboric acid, fluorosulphonic acid, trifluoromethylsulphonic acid ($CF_3-SO_3H$), benzenesulphonic acid and the alkyl-benzenesulphonic acids (with alkylic groups containing from 1 to 12 C atoms), as well as the corresponding alkali metal and ammonium salts; in particular, we cite, amongst the salts, ammonium chloride and ammonium fluoborate ($NH_4BF_4$).

According to a particular embodiment of the present invention, the reaction between the basic copolymer and the imidization agent may be realized inside an extruder, a mixer or any other similar apparatus, provided with degassing devices, described in detail (as an example) in German Patent No. 3.430.802.

The copolymers imidized according to the invention can be processed according to the customary thermoplastic polymer technologies, such as for example extrusion molding, injection molding and thermoforming, and they may be used for the manufacture of shaped articles of any form and size. Moreover these polymers may be used in the preparation of plates (sheets), shaped or drawn articles, films, pipes, filaments, etc. The new imidized copolymers may be mixed together with suitable additives such as for example products that improve resilience, reinforcing fibres (of glass, carbon, etc.), mineral fillers self-estinguishing agents, stabilizing agents, lubricants, plasticizers, etc. They may, lastly, be additioned with blowing or swelling agents (chlorofluoro-hydrocarbons, azo-dicarbonamide, etc.) and used in the expanded form, possibly mixed together with said fibres (of glass, carbon, etc.) and/or with other inorganic reinforcing charges or fillers, giving rise to compounds of low density and with physical properties of a very high level, in particular a high glass-transition temperature (Tg).

The glass-transition temperature (Tg) is determined by using a differential calorimeter; it is the temperature corresponding to the inflection point which appears on the thermogram when the thermal capacity changes abruptly; the rate of increase of the temperature equals 20° C./minute and the measurement is carried out after a first heating up to 200° C. and subsequent cooling down. The quality of the imidized copolymers may be even better evaluated by means of a thermogravimetric (TGA) analysis, by gradually raising the temperature (at a thermal rate of 20° C./min. and under a nitrogen atmosphere) and by continuously recording the decreasing weight of the sample.

As indicative data the following parameters are assumed:

(a) the TGA loss, that is the weight percentage of the sample being lost, following its heating under nitrogen atmosphere between 50° and 300° C.;

(b) the stability limit temperature (TLS), that is, the temperature corresponding to a TGA loss of 5%.

The examples that follow hereunder, are given for purely illustrative purposes and shall by no way be taken as limiting in any way the scope of the invention itself.

EXAMPLE 1

Into a glass reactor, fitted with a stirrer and a gas vent for exhausting the volatile components, were contemporaneously loaded 40 grams of a copolymer containing 89.8% by weight of styrene and 10.2% by weight of maleic anhydride, having a glass transition-temperature of 119.1° C., a TGA equal to 0.52%, TLS equal to 365° C. and an inherent viscosity (in THF at 30° C.; solution at a concentration of 0.25% by weight) equal to 0.82 dl/g, and 5 g of urea under a nitrogen atmosphere.

This reaction mixture was gradually heated up to the melt point and successively brought up to 215° C., while removing the volatile products formed during the reaction. The reaction was carried on gradually raising the temperature from 215° to 235° C. (in 1 hour), then maintaining the temperature at 235° C. for 3 hours, and finally cooling down under a nitrogen atmosphere. The raw reaction product was then diluted with 100 cm$^3$ of tetrahydrofurane, thereby obtaining a solution from which the polymer was recovered by coagulation with methanol. The thus imidized copolymer was filtered and dried under vacuum at 115° C. The copolymer itself had an inherent viscosity (in THF at 30° C.) equal to 0.82 dl/g, a stability limit-temperature (TLS) equal to 380° C. and a glass transition-temperature (Tg)=123.4° C. Moreover, said copolymer, when subjected to thermogravimetric analysis (TGA), with a temperature increase rate of 20° C./minute, under nitrogen atmosphere, showed a weight loss of 0.65% (within the temperature range from 50° C. to 300° C.).

EXAMPLE 2

Into the reactor of example 1 were contemporaneously introduced 40 g of a copolymer, containing 76.1% b.w. of styrene and 23.9% by weight of maleic anhydride, having a glass transition-temperature of 145.6° C. and an inherent viscosity of 0.53 dl/g, and 12 g of urea, under a nitrogen atmosphere. This reaction mixture was then gradually heated up to the melt point and then to 220° C., while removing the volatile products from the reaction. The reaction was then carried on, gradually raising the temperature from 220° to 250° C. (during a period of 0.5 hours). The temperature was maintained at 250° C. for 70 minutes and was then cooled down under a nitrogen atmosphere. The raw reaction product was then diluted with 100 cm$^3$ of tetrahydrofurane, thereby obtaining a solution from which the polymer was recovered by coagulation with methanol. The thus imidized copolymer was thereupon filtered and dried under vacuum at 115° C. The obtained data and results have been recorded on TABLE I.

EXAMPLE 3

Example 2 was repeated, except that 1.5 g of $NH_4Cl$ were admixed to the urea and that the heating was prolonged for another 60 minutes at a temperature of 275° C. The data and results are reported by TABLE I.

EXAMPLE 4

Example 2 was repeated, but adding to the urea 1.5 g of ammonium fluoborate ($NH_4BF_4$) and prolonging the heating for another 2 hours (at 250° C.) Data and results are reported by TABLE I.

TABLE I

| CHARACTERISTICS OF IMIDIZED COPOLYMERS | | | | |
|---|---|---|---|---|
| EXAMPLE (imidization agent) | Tg (°C.) | TGA Loss (% by weight) | TLS (°C.) | Inherent viscosity (dl/g) |
| Basic COPOLYMER | 145.6 | 0.85 | 352 | 0.53 |
| EX 2 (urea) | 170.5 | 0.77 | 370 | 0.52 |
| EX 3 (urea + $NH_4Cl$) | 169.0 | 0.79 | 375 | 0.50 |
| EX 4 (urea + $NH_4BF_4$) | 168.5 | 0.52 | 385 | 0.51 |

EXAMPLE 5

Example 2 was repeated, replacing urea by 20 g of biuret and adding 1.5 g of ammonium fluoborate ($NH_4BF_4$); the data and results are reported by TABLE II.

EXAMPLE 6

Example 2 was repeated, replacing urea by 17.2 g of N,N'-dimethyl-urea. The data and results are reported by TABLE II.

EXAMPLE 7

Example 6 was repeated, but adding also 1.5 g of ammonium fluoborate ($NH_4BF_4$). The data and results are reported by TABLE II.

EXAMPLE 8

Example 2 was repeated using the same reactor and the same original (starting) copolymer, but working in an organic solvent, consisting of a mixture of xylenes, and varying the operative conditions. Into the reactor were loaded contemporaneously: 30 g of the copolymer to be imidized, 8.8 g of urea and 25 cm$^3$ of a commercial mixture of xylenes, under a nitrogen atmosphere. This reaction mixture was then gradually heated up until full dissolution of the copolymer (at 123° C.); the temperature was brought up in 90 minutes to 130° C. and the mixture was allowed then to react at this temperature for 3 hours; finally the reaction mixture was cooled down under a nitrogen atmosphere.

The raw reaction product was thereupon diluted with 100 cm$^3$ of tetrahydrofurane, thereby obtaining a solution from which the polymer was recovered by precipitation with methanol, filtering and drying at 115° C., under vacuum. Data and results are reported by TABLE II.

EXAMPLE 9

Example 8 was repeated, operating in solution and varying the operative conditions.

20 g of polymer
6 g of urea
1.5 g of $ZnCl_2$
and 40 cm$^3$ of commercial cyclohexanone, were loaded contemporaneously into the reactor. The temperature was brought up, in 2 hours, to 170° C. and was then maintained constant for a further 4 hours, gathering the volatile components that had formed during the reaction. The polymer was then isolated as in example 8. Data and results are recorded on TABLE II.

TABLE II
CHARACTERISTICS OF THE IMIDIZED COPOLYMER

| EXAMPLE (imidizing agent) | Tg (°C.) | TGA LOSS (% b. w.) | TLS (°C.) | Inherent viscosity (dl/g) |
|---|---|---|---|---|
| EX 5 (biuret + $NH_4BF_4$) | 163 | 0.69 | 365 | 0.61 |
| EX 6 (N,N'-dimethyl-urea) | 145 | 0.80 | 380 | 0.55 |
| EX 7 (N,N'-dimethyl-urea + $NH_4BF_4$) | 145.5 | 0.73 | 385 | 0.58 |
| EX 8 (urea + xylenes) | 153.2 | 0.80 | 390 | 0.54 |
| EX 9 (urea + cyclohexanone + $ZnCl_2$) | 180 | 0.90 | 386 | 0.57 |

What is claimed is:

1. Process for imidizing copolymers of maleic anhydride with vinyl-aromatic monomers, using an urea as the imidizing agent.

2. Process according to claim 1, wherein the imidization is carried out keeping the reaction mixture in the molten state.

3. Process according to claim 1, wherein the imidization is carried out in the presence of an organic solvent.

4. Process according to claim 3, where said solvent is an aromatic hydrocarbon.

5. Process according to claim 3, wherein the solvent is a ketone.

6. Process according to any one of the preceding claims, wherein the amount of imidizing agent is between 1 and 300 mols per 100 mols of anhydride groups to be imidized.

7. Process according to any one of claims 1 to 5, wherein the copolymer to be imidized contains from 5 to 50% by mols of maleic anhydride.

8. Process according to any one of claims 1 to 5, wherein the imidization is performed in the presence of a catalyst, the amount of catalyst being between 0.0001 and 100 mols per 100 mols of anhydride groups present in the polymer.

9. Process according to any one of claims 1 to 5, wherein the vinyl-aromatic monomer is selected from the class consisting of styrene, alpha-methyl-sytrene, para-methyl-styrene, p-terbutyl-styrene, and o- and p-chloro-styrene.

10. Process according to any one of claims 1 to 5, wherein the copolymer to be imidized contains, besides vinyl-aromatic monomers, other olefinic monomers selected from the class consisting of acrylonitrile, vinyl chloride, vinylidene fluoride, vinyl acetate olefines, vinyl ethers, diolefines, and halogenated diolefines.

11. Process according to any one of claims 1 to 5, wherein the copolymer to be imidized contains an elastomeric phase.

12. Process according to any one of claims 1 to 5, wherein the imidizing agent is an urea having the formula RHN-CO-NHR', wherein R and R', equal to or different from each other, represent hydrogen, an $NH_2$-CO--group or alkyl, cycloalkyl, aryl or heterocyclic groups, and with or without substituents, and having from 1 to 8 C atoms.

13. Process according to any one of claims 1 to 5, wherein the imidizing agent is selected from the class consisting of urea ($NH_2$—CO—$NH_2$), dimethylurea, ethylurea and biuret.

14. Process according to any one of claims 1 to 5, wherein the imidization temperature ranges from 100° to 350° C.

15. Process according to any one of claim 8, wherein the catalyst is selected from the class consisting of Lewis acids, strong Broensted acids, showing a pK below 5, salts of said strong Broensted acids, and mixtures thereof.

16. Process according to claim 15, wherein the Lewis acid is selected from the class consisting of $ZnCl_2$, $BF_3$, $AlCl_3$, $AlBr_3$, $SnCl_4$, $TiCl_4$, $SbCl_5$, $SbF_5$, triphenyl-boron and triphenoxy-boron.

17. Process according to claim 15, wherein the strong Broensted acid (or its corresponding salt) is selected from the class consisting of hydrochloric, fluoboric, fluorosulphonic, trifluoromethyl-sulphonic, benzene sulphonic and alkyl-benzene-sulphonic acids having alkyl groups containing from 1 to 12 C atoms, and the ammonium and alkali metal salts of said acids.

18. Process according to claim 8, wherein the catalyst is selected from the class consisting of $ZnCl_2$, $AlCl_3$, para-toluene-sulphonic acid, ammonium fluoborate and ammonium chloride.

19. A catalytic process for imidizing a copolymer of maleic anhydride with styrene containing from 10% to 50% by mols of maleic anhydride, said process being characterized in that the imidization is achieved using urea ($NH_2$-CO-$NH_2$) as an imidizing agent and keeping the reaction mixture in the molten state, in the presence of 0.01–10 mols of catalyst per 100 mols of anhydride groups present in the copolymer; and moreovoer, in that:

the amount of urea is equal to or less than 250 mols per 100 mols of anhydride groups; and the catalyst is selected from the class consisting of zinc chloride, aluminum trichloride, ammonium fluoborate, p-toluene-sulphonic acid and ammonium chloride.

20. A catalytic process for the imidization of a copolymer of maleic anhydride with styrene containing from 10% to 50% by mols of maleic anhydride, said process being characterized in tht the imidization is achieved using urea ($NH_2CO$-$NH_2$) as an imidizing agent, and operating in an organic solvent, in the presence of 0.01–10 mols of catalyst per 100 mols of anhydride groups present in the copolymer and in that, moreover:

the amount of urea is either equal to or less than 250 mols per 100 mols of anhydride groups; and the catalyst is selected from the class consisting of: zinc chloride, aluminum trichloride, ammonium fluoborate, p-toluene-sulphonic acid and ammonium chloride.

21. Process according to claim 20, wherein the organic solvent is selected from the class consisting of o-, m-, p-xylene, cyclohexanone and mixtures thereof.

22. Process according to claim 1, wherein the vinyl-aromatic monomers are employed in admixture with other monomers.

23. Process according to claim 4, wherein the aromatic hydrocarbon is a xylene or a mixture of xylenes.

24. Process according to claim 5, wherein the ketone is cyclohexanone.

25. Process according to claim 6, wherein the amount of imidizing agent is from 5 to 250 mols per 100 mols of said anhydride groups.

26. Process according to claim 7, wherein the said copolymer contains from 10 to 50% by mols of said maleic anhydride.

27. Process according to claim 8, wherein the said amount of catalyst is from 0.01 to 10 mols per 100 mols of said anhyride groups.

28. Process according to claim 14, wherein the imidization temperature ranges from 120° to 280° C.

29. Process according to claim 15, wherein the said pK value is below 3.

30. Process according to claim 19, wherein the copolymer of maleic anhydride with styrene includes other co-monomers; wherein said copolymer contains from 20 to 50% by mols of maleic anhydride; and wherein the amount of urea is from 50 to 100 mols per 100 mols of the anhydride groups.

31. Process according to claim 20, wherein the amount of urea is from 50 to 100 mols per 100 mols of said anhydride groups.

* * * * *